United States Patent

Davey

[15] 3,691,821
[45] Sept. 19, 1972

[54] LEAK DETECTORS
[72] Inventor: Peter Gordon Davey, Horton-cum-Studley, England
[73] Assignee: Cosmopolitan Assurance Company Limited, Nassau, Bahamas
[22] Filed: April 1, 1970
[21] Appl. No.: 24,757

[30] Foreign Application Priority Data
April 3, 1969 Great Britain............17644/69

[52] U.S. Cl.................................................73/49.2
[51] Int. Cl.............................................G01m 3/32
[58] Field of Search............73/49.2, 40, 52; 137/110; 324/161

[56] References Cited
UNITED STATES PATENTS

| 2,853,874 | 9/1958 | Mennesson.....................73/40 |
| 2,814,203 | 11/1957 | Donohoe....................73/40 X |
| 2,645,117 | 7/1953 | Bendix et al................73/49.2 |
| 3,100,986 | 8/1963 | Starr et al......................73/40 |

Primary Examiner—Louis R. Prince
Assistant Examiner—William A. Henry, II
Attorney—Woodhams, Blanchard and Flynn

[57] ABSTRACT

The leak detector comprises a source of fluid pressure connected by a conduit with a valve to a reservoir having the same capacity and thermal-diffusion time as the container under test. The reservoir is connected to the container being tested through a flow detector. A conduit which can be selectively opened and closed by-passes the flow detector to enable the container to be brought to the test pressure quickly. When the container is at test pressure the valve between the source and the reservoir is closed to isolate the test apparatus from fluctuation of pressure in the source. Furthermore by making the reservoir of the same capacity and thermal diffusion time as the container being tested, the effects of adiabatic and isothermal changes in the reservoir and the container during testing are eliminated. The flow detector is a self-protecting flow detector. It has a by-pass conduit which is provided with a solenoid-operated valve. The solenoid is energized to open the valve by a bistable circuit when the output of the flow detector exceeds a predetermined value. The flow detector uses thermistors as flow-sensing elements. Each element comprises two thermistors forming parts of two potential dividers which are connected in series between supply terminals with the thermistors connected directly together and to a source of reference potential (such as earth). A resistor with a variable tap is connected across the two thermistors. The tap is connected to a differential amplifier and the position of the tap is so adjusted that the input current to the amplifier is independent of the pressure around the thermistors.

15 Claims, 7 Drawing Figures

LEAK DETECTORS

The present invention relates to improvements in apparatus for detecting leaks in containers.

A known apparatus for detecting leaks comprises a source of fluid pressure which is connected through a flow detector to a terminal port. A container to be tested is connected to the terminal port and brought to the pressure of the source. To facilitate this, the flow detector is provided with a by-pass conduit. A valve may be provided in series with the flow detector to protect it during the period in which the container is being brought to the pressure of the source. A valve in the by-pass conduit is then closed and if there is a valve in series with the flow detector, that valve is opened so that the only connection between the pressure-source and the container is through the flow detector. When the container has a leak, the pressure inside it will change towards the ambient pressure. This will give rise to a flow of fluid through the flow detector indicating that the container under test has a leak.

Such an apparatus is described in the specification of copending patent application.

Figures 1, 2:
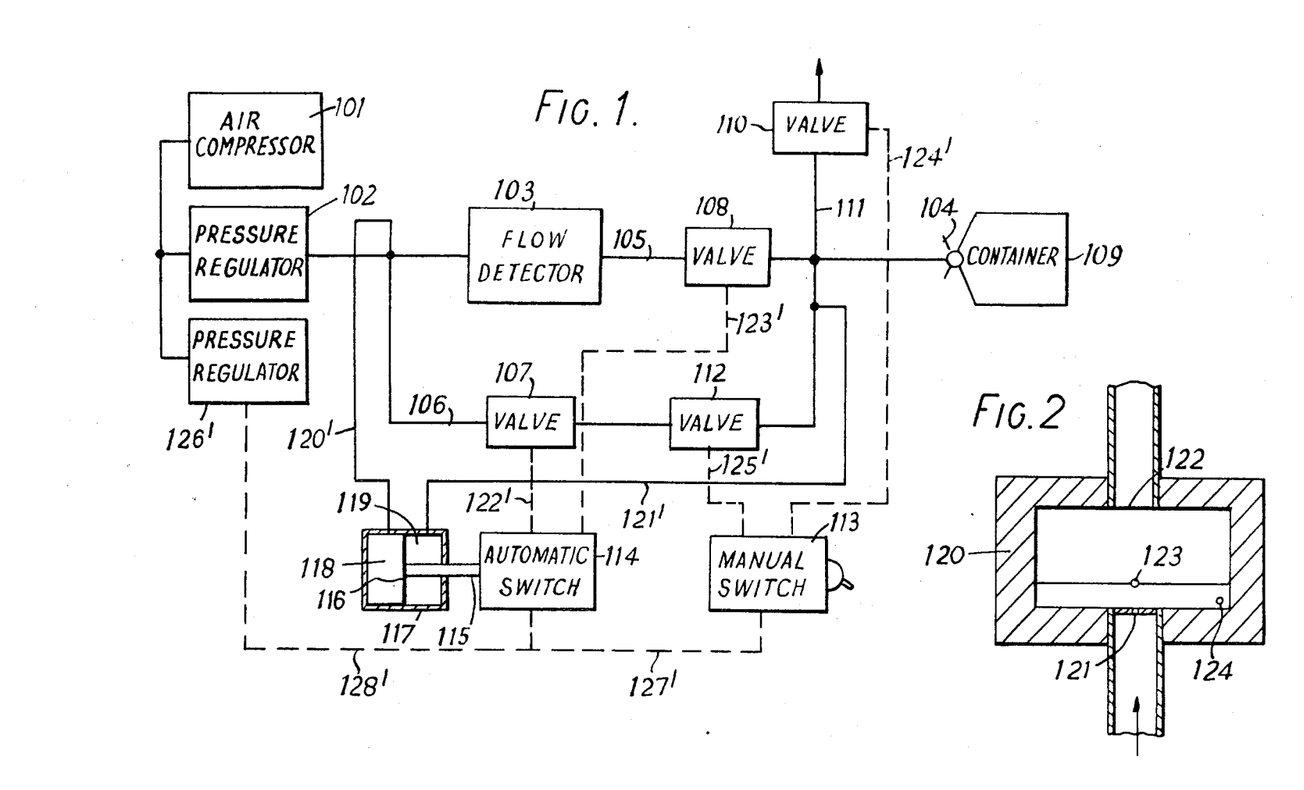
FIGS. 1 and 2 show the apparatus for testing fluid-tightness of containers as described in the specification of the above-mentioned patent application.

FIGS. 1 and 2 of the accompanying drawings show the apparatus for testing fluid-tightness of containers described in the specification of the above-mentioned patent application. FIG. 1 is a block diagram of the apparatus and FIG. 2 is a longitudinal section of a flow chamber with thermal flow-sensing elements for embodiment in the apparatus of FIG. 1.

A pressure source comprising an air compressor 101 and a pressure regulator 102 is connected through a thermal fluid-flow detector 103 to a terminal port 104 by a conduit 105 via a valve 108.

The flow detector 103 can be by-passed by a by-pass conduit 106 in which a first valve 107 is located. A second valve 108 is located in series with the flow detector 103 in the conduit 105 selectively to permit or prevent flow of air through the flow detector. A third, exhaust valve 110 is located in a conduit 111 which is connected at one end to the conduit 103 between the valve 108 and the terminal port 104 and which is free to the atmosphere at the other end. A fourth valve 112 is located in the by-pass conduit 116 in series with the first valve 107.

The valves 110 and 112 are controlled by a single manually operable switch 113. In one state of the switch the valve 110 is opened and the valve 112 is closed and in the other state of the switch valve 112 is opened and valve 110 is closed.

The valves 107 and 108 are controlled by a single automatically operated switch 114. The state of the automatic switch 114 is determined by the difference between the pressure at the pressure source and the terminal port 104. When the pressures at the source and at the port 104 are equal the switch is in the state in which the valve 107 is closed and the valve 108 is opened. When the pressure at the source is greater than the pressure at the terminal port 104 the valve 107 is opened and the valve 108 is closed.

To carry out a test a container 109 is connected to the terminal port 104 when the manual switch is in the state in which the valve 110 is open and the valve 112 is closed. The valve 107 is open and the valve 108 is closed since the pressure at the source is greater than the pressure at the port 104. The manual switch 113 is then operated closing the valve 110 while allowing the valve 112 to open. Air flows through the by-pass conduit 106 to the container 109 to bring the container to the test pressure. As soon as the pressures in the source and the container are equal, the pressures in the compartments 118 and 119 of the chamber 117 will be equal and the switch 114 will be moved to the state in which the valve 107 is closed and the valve 108 is opened. Air can no longer flow through the by-pass conduit 106 but if there is a leak, air will flow through the flow detector from the pressure source to replace the air lost from the container. The flow detector is a thermal fluid-flow detector and therefore if there is a leak there will be an immediate response by the flow detector.

Once the test has been made the manual switch 113 is operated to open the valve 110 and close the valve 112. The container exhausts to air through the conduit 111.

2 2 shows an example of a thermal fluid-flow detector in which thermistors are used as the flow-sensing elements. An active flow-sensing thermistor 123 is located in the chamber 120 in line with the inlet and outlet ports 121 and 122. A reference flow sensing thermistor 124 is located in a corner of the chamber 120 out of the path of flow of air through the chamber. The resistances of the thermistors are temperature-sensitive and a flow of air through the chamber causes the thermistor 123 to be cooled preferentially. The differential change in the resistances of the thermistors 123 and 124 is used to provide an indication of the flow. This indication is dependent on the mass-flow of air.

A disadvantage of the known apparatus is that fluctuations in the pressure of the source during testing give rise to spurious readings on the flow detector. Even when pressure regulators are provided these do not completely eliminate fluctuations.

This disadvantage can be overcome by connecting the source of fluid pressure to a reservoir by a conduit in which a valve is located, the reservoir being connected to the terminal port by the conduit in which the flow detector is located. Thus by closing the valve between the source and the reservoir during testing the source is isolated and therefore fluctuations in the pressure of the source do not interfere with the test.

There still remains a disadvantage of the above arrangement. Temperature changes of the fluid in the reservoir and the container under test during the test cause spurious readings.

According to the present invention in a first aspect, an apparatus for testing containers for leaks comprises a first terminal port to which a container is connected for testing and a source of fluid pressure connected to a second terminal port by a first conduit in which a first valve is located, the second terminal port being connected to the first terminal port by a second conduit in which a flow detector is located, and by a third conduit which by-passes the flow detector and in which a second valve is located, the second terminal port being connected to a reservoir having substantially the same capacity and thermal diffusion time as the container being tested and having no leaks. The reservoir may be a container identical to the container being tested and which is known to have no leaks. The arrangement eliminates spurious air flow through the flow detector caused by adiabatic and isothermal changes in the volume of the fluid in the container being tested following the abrupt change in its pressure.

An embodiment of the invention in the first aspect will now be described by way of example with reference to the accompanying drawings in which.

Figure 3:
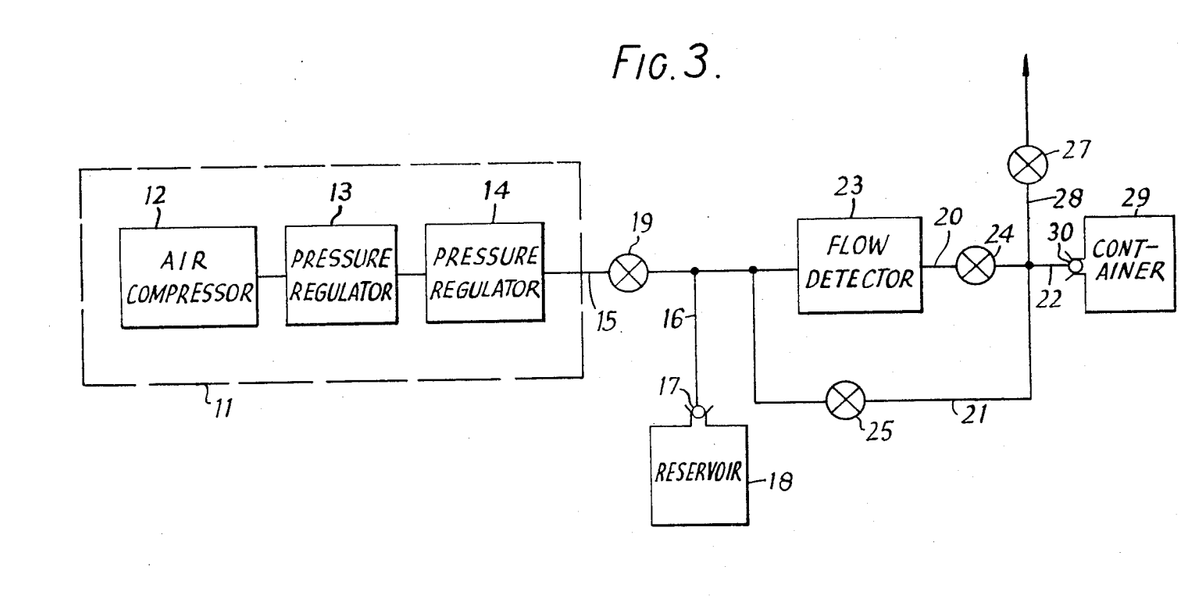
FIG. 3 illustrates an apparatus constructed according to the present invention for detecting leaks in containers.

A pressure source shown within broken lines 11 comprising an air compressor 12 and pressure regulators 13 and 14 is connected by conduits 15 and 16 to a terminal port 17. A container 18 identical with the container under test but which has no leaks is connected to the port 17 to serve as a reservoir. The terminal port 17 is connected to another terminal port 30 by the conduit 16, conduits 20 and 21 and a common conduit 22. A flow detector 23 and a valve 24 are located in series in the conduit 20 and a valve 25 is located in the conduit 21. An exhaust valve 27 is located in a conduit 38 which connects the terminal port 30 to the atmosphere through the common conduit 22.

A container 29 which is to be tested is connected to the terminal port 30 as shown. This is done when the valves 25 and 27 are open and the valves 19 and 24 are closed. When the container 29 is connected, the valve 19 is opened and valve 27 is closed. Air passes from the pressure source 11 to the reservoir 18 and the container 29. When the pressure in the container 29 is the same as that of the source 11 valves 19 and 25 are closed and the valve 24 is opened. If the container 29 has a leak air will escape from the container to the atmosphere and there will be a fall in the pressure inside the container 29. This will cause a flow of air through the flow detector. As the valve 19 at this stage is closed there will be no flow caused by fluctuations in the pressure of the source. In addition, since the reservoir 18 is a container identical with the container being tested it will have the same capacity and thermal diffusion characteristics as the container 29 under test. Pressure variations arising from adiabatic and isothermal changes in the reservoir and the container during filling will therefore balance one another and hence of themselves cause no flow through the detector 23. The test having been made, the valve 24 is closed and the valves 25 and 27 are opened. The pressure in the container 29 under test and the reservoir 18 is released to the air through the conduit 28 and the valve 27. The container 29 is then disconnected and the apparatus is ready for another test to be made. The valve 27 may be operated by a control which is manually operable. The valves 24 and 25 may be operated by a single control which is so arranged that when the valve 24 is open, the valve 25 is closed and vice versa. This control may be a differential-pressure switch which is connected to the pressure source 11 and to the terminal port 30. The switch is operated to a state in which the valve 24 is open and the valve 25 is closed when the pressures at the source and the terminal port are substantially equal. The valve 19 may be so controlled automatically that it is open only when the valve 25 is open and the valve 27 is closed.

In this way, once the container 29 is connected to the terminal port 30 and the switch controlling the valve 27 is operated the test sequence is performed automatically. The switch is then operated to a position in which the container 29 is allowed to exhaust to the atmosphere and the other valves return automatically to their original states and the reservoir 18 is allowed to exhaust to the atmosphere. Where difficulty is encountered in providing a valve 27 which is leak proof, the conduit 28 may be connected by a changeover valve to the conduit 15 instead of the conduit 22 and the container 29 and reservoir 18 may be exhausted by opening the valve 27 when the valves 19 and 25 are also open.

According to the present invention in a second aspect, apparatus for use in leak detectors comprises a flow detector and a conduit which by-passes the flow detector, the conduit being provided with a valve which is arranged to open when the flow through the flow detector exceeds a predetermined value. The flow detector can be arranged to provide an output voltage as a function of flow and the output voltage can be used to cause the valve to open when the voltage exceeds the predetermined value.

Preferably the apparatus comprises a flow detector which provides at an output a voltage indicative of the magnitude of the flow through the flow detector and a conduit which by-passes the flow detector and which is provided with a solenoid-operated valve, the current through the solenoid being controlled by a bistable circuit and the said voltage being applied to first inputs of two comparators the second inputs of which are connected to generators of respectively high and low voltages of predetermined magnitudes, a signal being issued from the first comparator when the magnitude of the voltage on its first input exceeds that of the voltage on its second input, and a signal being issued from the second comparator when the magnitude of the voltage on its first input is less than that on its second input, and the signals from the comparators being fed to the 'set' and 'reset' inputs respectively of the bistable circuit, so that the valve is opened when the flow through the flow detector exceeds a first predetermined value and the valve is closed when the flow is below a second predetermined value. Thus the second aspect of the invention can provide a self-protecting flow detector.

Figure 4:
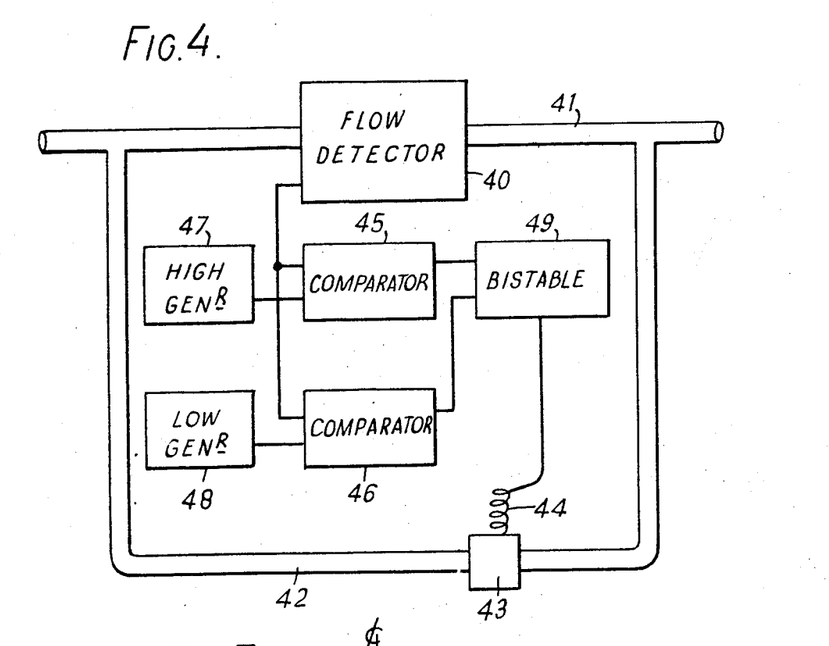
FIG. 4 illustrates a self-protecting flow detector which may be used in place of the flow detector illustrated in FIG. 3.

The second aspect of the invention will now be described by way of example with reference to FIGS. 4, 5 and 6 of the accompanying drawings which show, a self-protecting flow detector which may be used in place of the flow detector of FIG. 3, the flow-chamber of the flow detector, and a circuit diagram of the flow detector.

A flow detector 40 is located in a main conduit 41. A conduit 42 by-passes the flow detector 40 and is provided with a valve 43 which is operated by a solenoid 44. The flow detector is connected to two comparators 45 and 46 which are also connected to two generators 47 and 48. The outputs of the comparators are connected to a bistable circuit 49. The bistable circuit controls the flow of current to the solenoid 44.

The flow detector 40 provides a voltage to an output which is proportional to the magnitude of the flow of fluid through it. This voltage is fed to the comparators 45 and 46 where it is compared with voltages from the generators 47 and 48 of predetermined magnitudes. The high voltage from generator 47 is relatively large and is equal to the magnitude of the voltage from the flow detector for the maximum flow through the detector which it is safe to allow. The low voltage from the generator 48 is of one-twentieth to one-tenth the magnitude of the high voltage.

In the comparator 47 the voltage from the flow detector 40 is compared with the high voltage and if the flow detector voltage is of greater magnitude than the high voltage, a signal issues from the output terminal of the comparator 47 to the 'set' input of the bistable circuit 49. The bistable circuit is triggered thereby to a stable state in which it allows current to flow to the solenoid 44. The solenoid is energized and the valve 43 is opened allowing fluid to flow through the by-pass conduit 42. The flow through the flow detector is thus reduced.

When the magnitude of the voltage from the flow detector falls below that of the low voltage a signal issues from the second comparator to the 'reset' input of the bistable circuit 49. The bistable circuit is triggered to its second stable state in which it allows no current to flow to the solenoid or a current below the hold-on current of the solenoid. The valve 32 is thus closed and no fluid can flow through the by-pass conduit 42.

Figure 5:
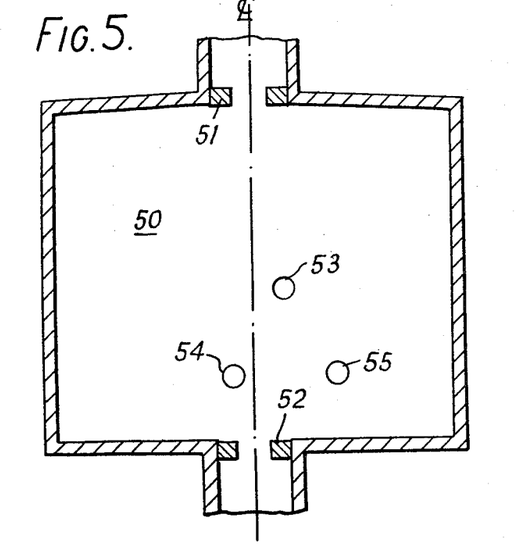
FIG. 5 illustrates the flow chamber of the flow detector.

FIG. 5 shows the chamber 50 of the flow detector which is connected to the main conduit 41 through an inlet port 51 and an outlet port 52. Three thermistors are located in the chamber 50. A heater thermistor 53 is located to one side of the centerline of the chamber and a current is passed through it to cause it to give out heat. An active thermistor 54 is located slightly to one side of or on the centerline. A reference thermistor 55 is located relatively remote from the centerline. The thermistors 54 and 55 are equidistant from the thermistor 53. When there is no fluid flow through the chamber 50 isotherms are symmetrical about the heater thermistor 53 so that the active thermistor 54 and the reference thermistor 55 are at the same temperature. As fluid-flow through the chamber causes a greater movement of air near the thermistor 54 than at the thermistor 55 the isotherms are distorted in such a way that the active thermistor is at a lower temperature than the reference thermistor. The difference in resistance of the thermistors caused by their temperature difference, is used in a bridge circuit to produce a signal indicative of the flow of fluid.

Figure 6:
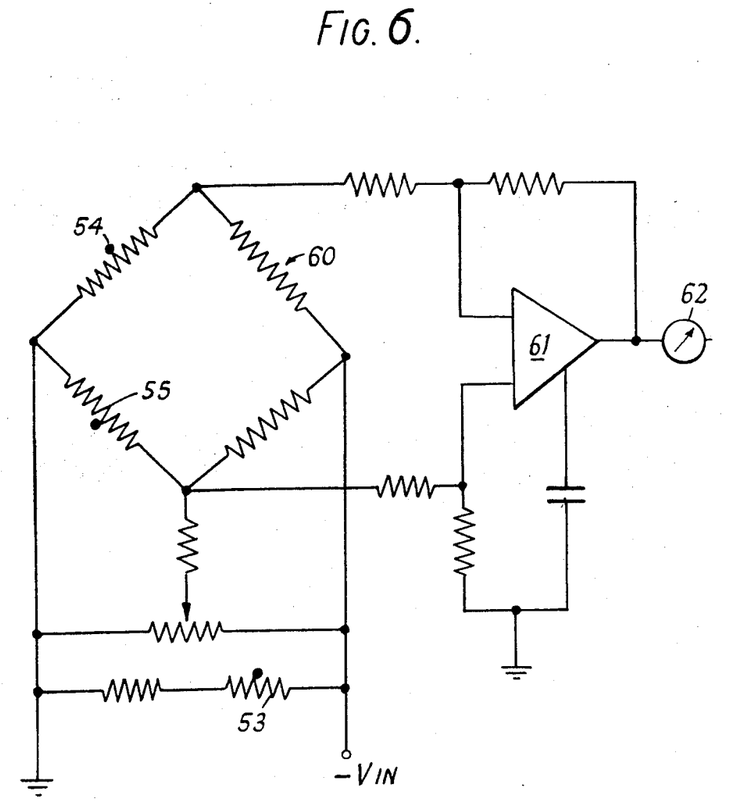
FIG. 6 illustrates a circuit diagram of the flow detector.

FIG. 6 shows the bridge circuit. The heater thermistor 53 is supplied with a steady current by the voltage source $-V_{IN}$. The thermistors 54 and 55 are located in two arms of a four-resistor bridge 60. The potential across the bridge which is developed when there is a differential change in the resistances of the thermistors in FIG. 5 is fed to an amplifier 61. The output of this amplifier is fed to a meter 62 which indicates the magnitude of the flow through the chamber 50 and to the comparators 45 and 46.

Thus the present invention provides a flow detector which is protected from large flows.

A remaining difficulty of the known leak-testing apparatus is that variations in pressure can cause a drift in the zero of the flow detector because of the pressure-dependence of the temperature and hence of the resistance of the thermistors.

According to the present invention in a third aspect, apparatus for use in flow detectors includes two thermistors, the thermistors forming parts of two potential dividers which are connected in series between supply terminals with the thermistors connected directly together and to a source of reference potential (such as earth), a resistor with a variable tap being connected across the two thermistors the tap of the resistor being connected to a differential amplifier and the position of the tap being so variable that, in operation, input current to the amplifier can be made substantially independent of the pressure around the thermistors.

Figure 7:
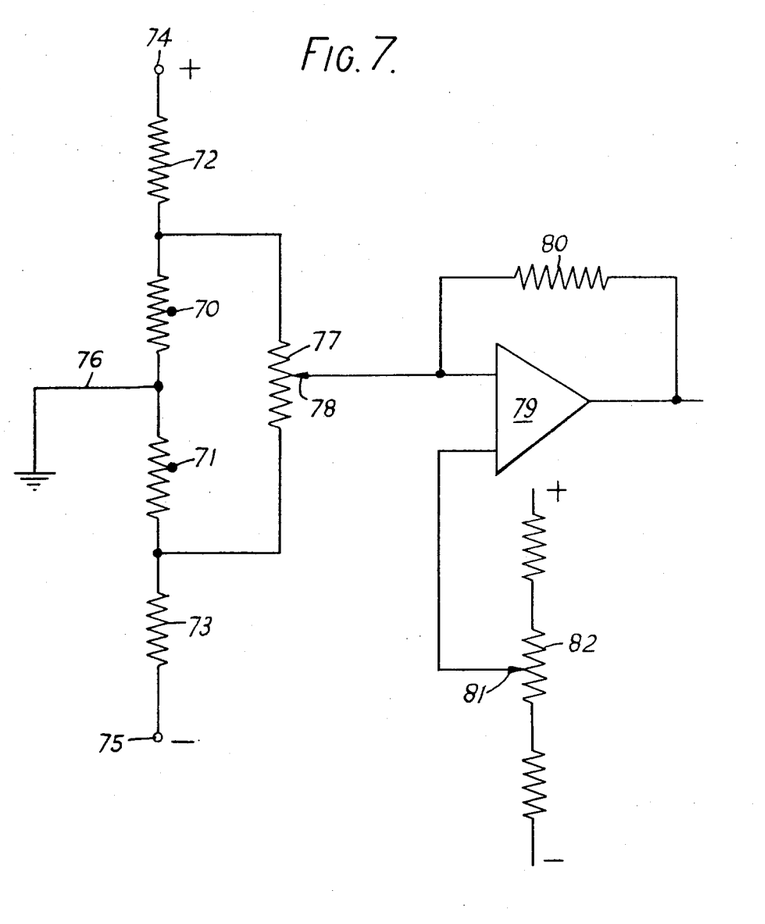
FIG. 7 illustrates a circuit diagram which represents a further aspect of the present invention.

An embodiment of the invention in the third aspect will now be described by way of example with reference to FIG. 7 of the accompanying drawings.

Two thermistors 70 and 71 are located side-by-side in a chamber of a flow detector. The thermistors 70 and 71 form with resistors 72 and 73 two potential dividers which are connected in series with supply terminals 74 and 75. The junction between thermistors 70 and 71 is connected to earth by a lead 76. A resistor 77 is connected across the two thermistors, 70 and 71. The resistor 77 has a variable tap 78 which is connected to one input of a differential amplifier 79. The amplifier is provided with negative feedback through a resistor 80. A variable tap 81 on a potential divider 82 provides the second input of the differential amplifier.

The resistance of a thermistor varies with the applied pressure since the temperature is affected by the better conduction and convection cooling at higher pressures. Taking a two-point approximation, the resistance of the thermistor 70 can be written $R_1 = a_1 P + b_1$ and the resistance of the thermistor 71 can be written $R_2 = a_2 P + b_2$ where $a_1$, $a_2$, $b_1$ and $b_2$ are constants and $P$ is the prevailing pressure.

If $n$ to $1 - n$ is the ratio of the resistances of the parts of resistor 77 the input current to the amplifier is proportional to $(a_1 P + b_1)/n - (a_2 P + b_2)/(1 - n)$. Thus by the correct setting of the tap 78 and hence $n$, the input current can be made independent of pressure. The tap 81 is so adjusted that under conditions of no flow through the flow detector there is no output from the amplifier.

I claim:

1. In an apparatus for testing containers for leaks, the combination comprising:
   a first terminal port;
   a container connected to the terminal port for testing;
   a second terminal port;
   a source of fluid pressure;
   a first conduit connecting the source of fluid to the second terminal port;
   a first valve located in the first conduit;
   a second conduit connecting the first terminal port to the second terminal port;

a flow detector located in the second conduit;
a third conduit connecting the first terminal port to the second terminal port, which conduit by-passes the flow detector;
a second valve located in the third conduit; and
a reservoir connected to the second terminal port, said reservoir having substantially the same capacity and thermal diffusion time as the container being tested and having no leaks.

2. An apparatus as claimed in claim 1 wherein the reservoir is a container identical to the container being tested and known to have no leaks.

3. An apparatus as claimed in claim 2 wherein the flow detector is a thermal fluid-flow detector.

4. An apparatus as claimed in claim 1 wherein a third valve is located in the second conduit in series with the flow detector.

5. An apparatus as claimed in claim 4 wherein the second and third valves are operated by a single control which closes the second valve when the third valve is opened and closes the third valve when the second valve is opened.

6. An apparatus as claimed in claim 1 including a conduit connecting the first terminal port to the atmosphere and an exhaust valve located in the said conduit.

7. An apparatus as claimed in claim 1 in which the flow detector includes two thermistors, and further including two potential dividers, the thermistors forming parts of the two potential dividers, supply terminals and a source of reference potential, the potential dividers being connected in series between the supply terminals with the thermistors connected directly together and to the source of reference potential, a resistor with a variable tap, the resistor being connected across the two thermistors, and a differential amplifier, the tap on the resistor being connected to the differential amplifier, whereby the position of the tap can be so varied that, in operation, input current to the differential amplifier can be made substantially independent of the pressure around the thermistors, and further including means for opening said second valve when the flow through the flow detector exceeds a predetermined value.

8. An apparatus as claimed in claim 1 including means for opening said second valve when the flow through the flow detector exceeds a predetermined value.

9. An apparatus as claimed in claim 8 wherein the flow detector provides an output voltage as a function of flow and the output voltage is fed to the means for opening the valve.

10. An apparatus as claimed in claim 8, wherein the flow detector has an output and provides at said output a voltage indicative of the magnitude of flow through the flow detector, wherein the second valve is a solenoid-operated valve, and wherein the means for opening the second valve includes a bistable circuit controlling the flow of current through the solenoid of said second valve;
said bistable circuit having set and reset inputs, two comparators, each comparator having two inputs and one output;
a high-voltage generator and a low voltage generator, one of the comparators having its first and second inputs connected to the output of the flow detector and the high-voltage generator respectively, the other comparator having its inputs connected to the output of the flow detector and the low-voltage generator respectively, the first comparator issuing a signal at its output when the magnitude of the voltage on its first input exceeds that on its second input, and the second comparator issuing a signal at its output when the magnitude of the voltage on its first input is less than that on its second input, the outputs of the said one and said other comparators being connected respectively to the set and reset inputs of the bistable circuit whereby the second valve is opened when the flow through the flow detector exceed a first predetermined value and the second valve is closed when the flow is below a second predetermined value.

11. An apparatus as claimed in claim 1 wherein the flow detector includes:
two thermistors;
two potential dividers, the thermistors forming part of the two potential dividers;
supply terminals and a source of reference potential, the potential dividers being connected in series between the supply terminals with the thermistors connected directly together and to the source of reference potential;
a resistor with a variable tap, the resistor being connected across the two thermistors; and
a differential amplifier, the tap on the resistor being connected to the differential amplifier, whereby the position of the tap can be so varied that, in operation, input current to the differential amplifier can be made substantially independent of the pressure around the thermistors.

12. An apparatus as claimed in claim 11 including a further potential divider; supply terminals, the potential divider being connected between the supply terminals, and a tap on the potential divider connected to the differential amplifier.

13. An apparatus as claimed in claim 11 including a flow detector having a flow chamber, the two thermistors being located side-by-side in the chamber of the flow detector.

14. In an apparatus for testing containers for leaks, the combination comprising:
a flow detector including two thermistors of resistance responsive to fluid flow rate and pressure in the flow detector;
means for supplying fluid to the container to be tested through the flow detector;
an impedance and means connecting said thermistors in series across said impedance;
means selectively connectible to said impedance at any of several points thereon for sensing variations in the resistance in said thermistors due to variations to said fluid flow rate while substantially ignoring changes in the resistance of said thermistors due to changes in said pressure;
means connected across the flow detector and including a by-pass valve openable for by-passing fluid flow around the flow detector;
means for opening said by-pass valve when the flow through the flow detector exceeds a predetermined value so as to protect the flow detector from excessive flow therethrough.

15. An apparatus as claimed in claim 14 in which said means for supplying fluid includes means for connecting one side of said flow detector to the container to be tested, a source of fluid under pressure, means including a further valve for connecting said source to the other side of the flow detector, a reservoir connected to said other side of the flow detector, the reservoir having substantially the same capacity and thermal diffusion time as the container being tested and having no leaks, whereby fluid may be supplied to said reservoir through said valve from said source preparatory to testing of the container and upon closure of said further valve fluid may be supplied from said reservoir through the flow detector as needed to compensate for leakage in the container tested.

* * * * *